May 23, 1939. K. BRATING Re. 21,094
PROCESS AND APPARATUS FOR THE PRODUCTION OF HOLLOW BODIES FROM CELLULOSE PRODUCTS AND OTHER PLASTIC MASSES
Original Filed Jan. 21, 1935
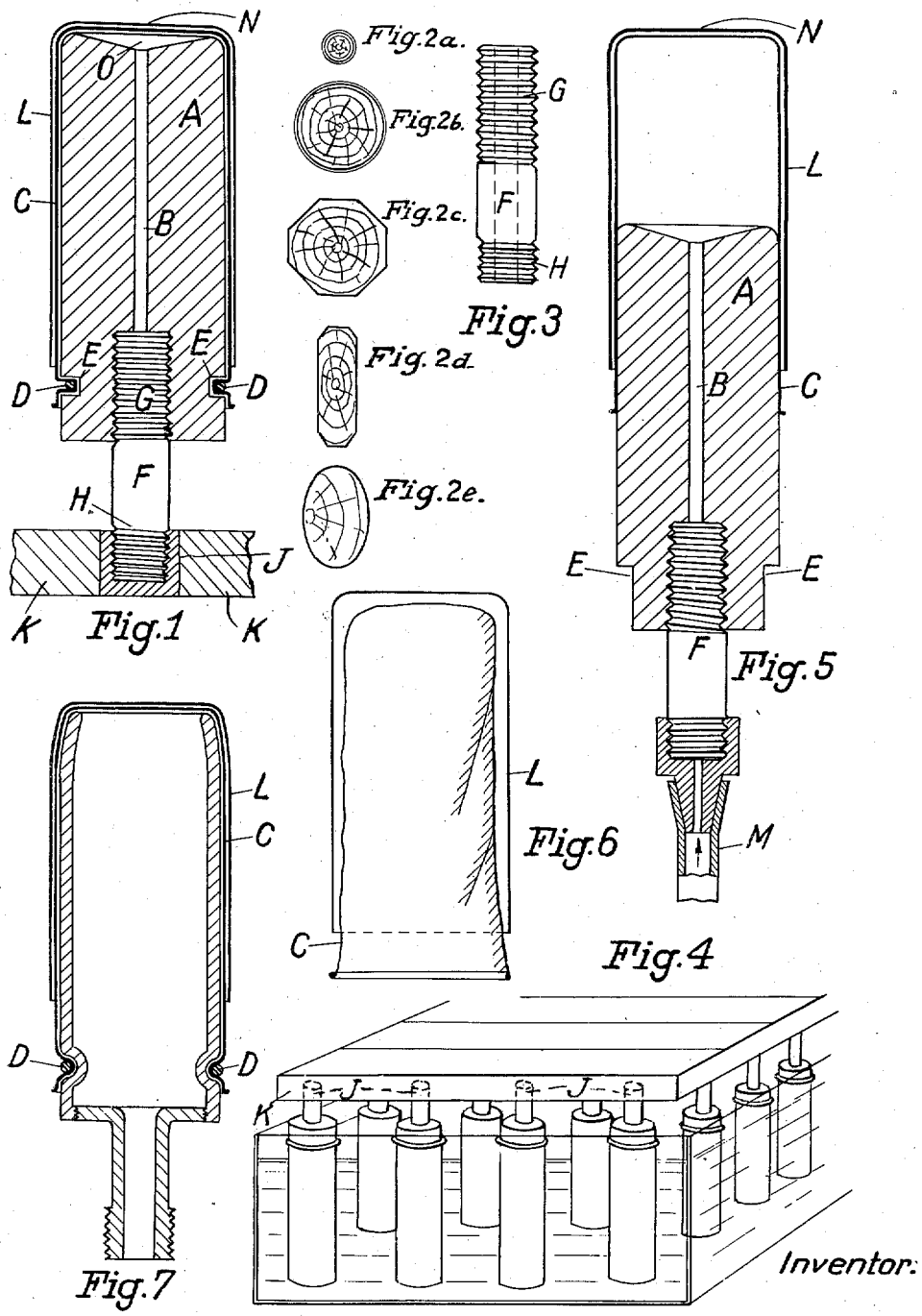
Inventor:
KURT BRATRING
BY ATTORNEY
Paul Carpenter Reissued May 23, 1939

Re. 21,094

UNITED STATES PATENT OFFICE 21,094

PROCESS AND APPARATUS FOR THE PRODUCTION OF HOLLOW BODIES FROM CELLULOSE PRODUCTS AND OTHER PLASTIC MASSES

Kurt Bratring, Berlin, Germany, assignor, by mesne assignments, to Neocell Products Corporation, a corporation of Delaware Original No. 2,114,794, dated April 19, 1938, Serial No. 2,640, January 21, 1935. Application for reissue November 19, 1938, Serial No. 241,437

14 Claims. (Cl. 18—41)

This invention relates to a process and apparatus for the production of hollow bodies from cellulose products and other plastic masses.

It is already known that hollow bodies may be made from cellulose products and other plastic masses in moulds comprising several relatively displaceable wedge-shaped parts, the outer separating edges being covered by a rubber cover to be drawn over the entire mould. These known moulds are useful industrially but have been shown to have several disadvantages. Thus, these moulds are limited with reference to the diameter and lengths of the hollow bodies, as when the hollow bodies to be produced have a very small diameter and/or very great length the various wedge-shaped parts of the mould have to be kept very flat, and considerable force is required to effect their relative displacement for the purpose of releasing the mould from the hollow body produced, because the moulds composed of the wedges are firmly pressed together by the hollow bodies formed thereon. In the manufacture of hollow bodies by the use of these known moulds it has been further shown that the lines of separation of the mould parts at times are not fully covered by the rubber and can be detected, though faintly, on the hollow bodies formed.

In connection with the production of hollow bodies from cellulose products, particularly those having a small diameter and great length, it has been proposed to make the bodies on metal moulds provided with a valve, and, after drying, to release the cellulose products from the mould by means of compressed air. These moulds are also useful industrially. A considerable pressure, often exceeding one atmosphere excess pressure, is always necessary for releasing the hollow bodies, or during the blowing operation it is necessary to release the hollow bodies from the mould by a rolling motion. To effect this kind of release a special apparatus is necessary as described in American patent application Serial Number 644,942 dated November 30, 1932, issued May 21, 1935, as Patent No. 2,001,765. In blowing in the air to strip the hollow body from the metal mould it cannot always be avoided that the edge of the valve at times is visible in the hollow body as a sharp line.

The present invention avoids all the disadvantages referred to and enables hollow bodies from the smallest to the largest diameter to be produced from cellulose products, the quality of the finished hollow bodies with regard to appearance, particularly smoothness of the surface, and with regard to the uniformity of the hollow bodies, being quite marked.

The invention consists in a method of producing hollow bodies from cellulose products and other plastic masses, in which the plastic mass is applied to a mould, for example of wood, metal and the like, over which is stretched an elastic skin, for example of rubber, and in which after solidification of the mass the hollow body is stripped from the mould by blowing in air between the latter and the body.

A further feature of the invention is a method in which the plastic mass is applied to a massive mould on which an elastic skin is placed under preliminary tension in the direction in which the hollow body is stripped from the mould, and in which after solidification of the mass air is blown in between the mould and rubber skin in order to strip the hollow body and the elastic skin from the mould. Preferably, the preliminary tension of the rubber skin is removed before air is blown in.

A further feature of the invention is a method of the kind specified, in which prior to the application of the elastic skin the mould is smoothed or polished by special means, for example by applying a coating or layer of lacquer, talcum, glycerine or the like.

The mould for carrying out the method is to be provided with means, for example a groove having a fitting rubber ring or the like in order that the elastic skin, for example of rubber, placed on the mould may be subjected to tension substantially in the direction in which the hollow body is stripped from the mould.

The mould for carrying out the method has one or more channels for permitting the blowing in of the air, the channel or channels advantageously having enlarged outlet orifices, for example of funnel shape.

Further features of the invention will be appreciated from the following description and the accompanying drawing illustrating several forms of the invention by way of example.

Figure 1 shows one embodiment of the invention with a hollow body formed on the mould.

Figures 2*a* to 2*e* inclusive show a few cross-sectional views of cores or molds defining different shapes of hollow bodies which may be produced according to the invention.

Figure 3 shows a pipe joint by means of which the mould for example is screwed onto the blowing apparatus.

Figure 4 shows several moulds according to the invention united to form a battery during the dipping operation to form the hollow bodies.

Figure 5 shows the mould according to the invention during the blowing operation whereby the hollow body together with the elastic skin is stripped from the mould.

Figure 6 shows the hollow body after being stripped from the mould, the rubber skin in consequence of the removal of the tension having already been substantially released from the hollow body.

Figure 7 shows a further embodiment of the invention having a very enlarged channel for the blowing in of the air.

Figure 1 shows a mould for producing hollow bodies from cellulose products which essentially comprises a massive core A having a central longitudinally extending air channel B. The core of the mould may be made of various materials. Ordinarily for cheapness, wood is used although various artificial masses, such as plaster of Paris, cement papier-mâché and so forth, and also substances composed of artificial resins or albuminous materials may be equally well used. Further, metals are often very suitable for forming the core of the mould, particularly if—for the purpose of reducing the weight of the mould—the air channel B is enlarged and consequently the wall of the mould is made as thin as possible, as shown in Figure 7. For making a mould of the latter type, glass, porcelain, and so forth is particularly suitable for special purposes.

An elastic skin C, for example of rubber, is placed under tension over the fixed core A and is held in a tensioned condition. The tensioning of the rubber skin can be effected, for example, by a rubber ring D firmly held in a groove extending around the mould. Instead of the groove shown in Figures 1 and 7 for receiving the rubber ring, the mould can instead be provided with a part of reduced diameter, as shown in Fig. 5, which may be tapered if desired to facilitate the removing of the rubber ring. The elastic sheath for the mould is preferably made of rubber, although other elastic materials not attacked by the solvents for the material of the hollow bodies may be used, for example polymerization products of organic compounds or glycerine-containing gelatine masses.

The pipe joint F (Figure 3) provided at both ends with screw threads serves as a handle for the mould. One end G of the pipe joint F is screwed in an air tight manner into the massive core A thereby forming a connection with the air channel B. By means of the other end H of the screw-threaded joint F it is possible to secure the moulds in wooden bars K (Figures 1 and 4) provided with nuts J, and by assembling a number of such bars to unite a large number of moulds for the mechanical dipping operation in dipping batteries (Figure 4).

By a single immersion or by repeated immersion into a suitable solution, for example of acetyl cellulose in acetone, a hollow body will be formed on the moulds over which the rubber skin has been placed. Solutions of cellulose esters and ethers in organic solvents, concentrated gelatine solutions or solutions of artificial and natural resins or viscose solutions or even already preformed, flexible and still moist hollow bodies may also serve as the material for the hollow bodies to be produced.

The application of liquid masses to the mould can also be effected by squirting or casting.

After the hollow bodies have dried sufficiently on the moulds, the individual moulds are taken out of the dipping apparatus, the rubber ring D is removed and the screw threaded joints F are connected with a compressed air pipe M (Figure 5). It has been shown that even a slight air pressure is sufficient to blow the rubber bag together with the set hollow body away from the mould. Frequently, a pressure of about ½ atmosphere excess pressure is sufficient to strip the hollow body together with the rubber skin from the core. The stripping can be assisted by a light pressure against the end face N. Such aids are mostly not necessary, however, if prior to drawing over the rubber skin the massive core A is coated with a smoothing layer of lacquer and is lightly dusted with talcum powder. Also, smoothing means, such as glycerine, etc. may be used.

After the hollow body and the rubber skin have been blown off by the air, the skin or bag contracts as the tension is relieved and separates itself from the hollow body. The rubber skin, which is now loose in the hollow body, as shown in Figure 6, can be withdrawn and used again for the production of other hollow bodies.

In order to obtain hollow bodies with end faces as smooth as possible, it is advantageous to make the mouth of the air channel B in the form of a flat funnel O, the wide orifice of which is firmly spanned by the rubber skin. By this means the forcing of the mouth of the channel B into the hollow body is avoided.

By employing moulds of this kind, hollow bodies of conical and cylindrical form as well as of oval, angular, etc. cross section may be produced of almost any desired size, as is indicated in Figures 2*a* to 2*e* inclusive.

The following are special advantages of the method and apparatus according to the invention. The releasing of the hollow bodies together with the rubber skin can be effected easily and rapidly even with multi-edged models, whereas with the known method the releasing operation, particularly with edged models, requires special care and therefore takes some time. The new method facilitates the production of hollow bodies with perfectly smooth surfaces and perfectly uniform quality in each piece. It is of particular advantage that thin walled hollow bodies of 0.05 mm. thickness and under may be produced in any desired size. The production of extremely thin walled hollow bodies was hitherto very difficult. On the other hand the new moulds are also suitable for making very thick walled hollow bodies of 1 mm. thickness and more. The assembling of the mould for the manufacture and also the removal of the hollow bodies are extraordinarily simple so that very little attention and very few working operations are necessary. It may also be mentioned that the mould may be manufactured extraordinarily cheaply and is very durable.

What I claim is:

1. A method of producing hollow bodies from cellulose products and other plastic masses, in which the plastic mass is applied to a mould, for example of wood, metal and the like, over which is stretched under tension an elastic skin, for example of rubber, and held under tension on the mold and in which after solidification of the mass air under pressure is blown in between the hollow body and the mould to strip the body from the mould.

2. A method according to claim 1, in which the preliminary tension of the rubber skin is removed before air is blown in.

3. A method according to claim 1, in which prior to the application of the elastic skin the mould is smoothed or polished by applpication of a lubricant.

4. A method of producing hollow bodies from cellulose products and other plastics which consists of stretching an elastic skin, for example, rubber, over a mould under tension in the direction in which the hollow body is to be stripped from the mould, applying plastic to the mould, solidifying the plastic, relieving the tension of the elastic skin and then blowing air between the mould and the rubber skin to strip the hollow body and elastic skin from the mould.

5. A method according to claim 4 in which prior to the application of the elastic skin, the mould is smoothened or polished by the application of a lubricant to facilitate the relief of the tension on said elastic skin.

6. In a method of producing hollow bodies from cellulose products and other plastic masses in which the plastic mass is applied to a mould, the steps which comprise stretching an elastic skin over the mould smoothened or polished by the application of a layer of a smoothening or polishing agent, applying the plastic mass to the skin so deposited on the mould, solidifying the mass and stripping the hollow body so formed by blowing air between the elastic skin and the mould.

7. A method of producing hollow bodies from cellulose products and other plastic masses which includes the steps of stretching an elastic skin over a mould in the direction in which the hollow body is adapted to be removed or stripped therefrom, applying the plastic mass to the skin, and then, after solidification of the plastic mass, relieving the tension of the skin and blowing air between the mould and the rubber skin to strip the hollow body and the elastic skin from the mould.

8. A mould for the purpose described having fitted thereover an elastic skin serving as the deposition surface for cellulose products and other plastic masses including means formed on said mould to retain said elastic skin under tension in the direction in which the hollow body is stripped from the mould.

9. A method of producing hollow bodies from cellulose products and other plastic masses in which the plastic mass is applied to a mould, for example of wood, metal and the like, over which is stretched an elastic skin under tension in the direction in which the hollow body is stripped from the mould, and in which after solidification of the mass, air under pressure is blown in between the mould and the rubber skin in order to strip the hollow body and the skin from the mould.

10. A mould of the character described, said mould having, in combination, means, for example a groove formed on the mould and positioned to be free from interference with the article to be formed, and having a fitting rubber ring or the like which is arranged to be retained by said groove, and an elastic skin for the mould, said ring and the groove cooperating with the skin to hold the same under tension on the mould in the direction in which the hollow body is stripped from the mould.

11. A mould of the character described, said mould having one or more channels for permitting the blowing in of air under pressure, the channel or channels having a flaring outlet orifice adjacent the inner end of the article to be formed.

12. A method of producing hollow bodies from cellulose products and other plastics which consists in stretching an elastic skin under tension over a mould, depositing a solidifiable plastic on the skin to form a hollow body, solidifying the same, relieving the tension on the elastic skin and removing the skin and hollow body together from the mould by fluid pressure applied between the mould and the elastic skin, the tension applied to the elastic skin being sufficient to cause it automatically substantially to separate from the hollow body on such removal.

13. A method of producing hollow bodies from cellulose products and other plastics which consists in stretching an elastic skin under tension over a mould, depositing a solidifiable plastic on the skin to form a hollow body, solidifying the same, relieving the tension on the elastic skin and removing the skin and hollow body together from the mould, the tension applied to the elastic skin being sufficient to cause it automatically substantially to separate from the hollow body on such removal.

14. A mould for the production of hollow articles by immersion in a bath of a dissolved plastic substance which comprises, in combination, a rigid core having an end face dished substantially throughout said end face, and a one-piece elastic jacket drawn under tension over said dished end and toward the other end and over the full dipping length of the core.

KURT BRATRING.